US006324347B1

United States Patent
Bacs, Jr. et al.

(10) Patent No.: US 6,324,347 B1
(45) Date of Patent: *Nov. 27, 2001

(54) AUTOSTEREOSCOPIC IMAGING APPARATUS AND METHOD USING A PARALLAX SCANNING LENS APERTURE

(75) Inventors: Aron Bacs, Jr., Burke; Christopher A. Mayhew, Oakton, both of VA (US)

(73) Assignee: Vision III Imaging, Inc., Herndon, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/373,505

(22) Filed: Aug. 13, 1999

Related U.S. Application Data

(62) Division of application No. 08/902,958, filed on Jul. 30, 1997, now Pat. No. 5,991,551, which is a continuation of application No. 08/358,176, filed on Dec. 16, 1994, now Pat. No. 5,678,089, which is a continuation-in-part of application No. 08/148,916, filed on Nov. 5, 1993, now Pat. No. 5,448,322.

(51) Int. Cl.[7] ............................. G03B 29/00; G03B 35/00
(52) U.S. Cl. ..................... 396/429; 396/324; 345/421; 345/427; 355/22
(58) Field of Search ................................. 396/324, 333, 396/335–340, 429; 352/43, 57, 58, 62, 64, 86; 348/42, 46; 359/22, 23, 25, 26, 462, 463, 478, 479; 353/10; 355/22; 345/421, 427, 419

(56) References Cited

U.S. PATENT DOCUMENTS

| | | | |
|---|---|---|---|
| 1,580,242 | 4/1926 | Girsdansky | 352/86 |
| 2,056,600 | 10/1936 | Crosier | 352/65 |
| 2,104,779 | 1/1938 | Terwilliger | 352/43 |
| 2,146,135 | 2/1939 | Adams et al. | 352/86 |
| 2,161,120 | 6/1939 | Alder | 352/86 |
| 2,792,745 | 5/1957 | Weber | 352/65 |
| 4,303,316 * | 12/1981 | McElveen | 352/57 |
| 4,568,160 * | 2/1986 | Krueger | 352/86 |
| 4,965,753 * | 10/1990 | Kraemer | 345/425 |
| 5,025,400 * | 6/1991 | Cook et al. | 345/426 |
| 5,113,213 * | 5/1992 | Sandor et al. | 355/22 |
| 5,287,437 * | 2/1994 | Deering | 245/427 |
| 5,425,137 * | 6/1995 | Mohan et al. | 345/419 |
| 5,455,689 * | 10/1995 | Taylor et al. | 358/450 |
| 5,550,959 * | 8/1996 | Freeman | 345/427 |
| 5,633,995 * | 5/1997 | McClain | 345/419 |
| 5,764,231 * | 6/1998 | Ray et al. | 345/419 |

FOREIGN PATENT DOCUMENTS

| | | | |
|---|---|---|---|
| 794608 | 2/1936 | (FR) | 352/86 |
| 1126066 | 7/1956 | (FR) | 352/86 |
| 259341 | 10/1926 | (GB) | 352/86 |

OTHER PUBLICATIONS

Michael Potmesil and Indranil Chakravarty, "Synthetic Image Generation with a Lens and Aperture Camera Model", ACM Transactions on Graphics, vol. 1, No. 2, Apr. 1982, pp. 85–108.*

* cited by examiner

*Primary Examiner*—Alan A. Mathews
(74) *Attorney, Agent, or Firm*—Finnegan, Henderson, Farabow, Garrett & Dunner L.L.P.

(57) ABSTRACT

A lens aperture of an autostereoscopic camera is moved in a parallax scanning pattern through a plurality of disparity positions offset from the optical axis of the camera lens. Images of a scene being photographed, as viewed through the lens aperture in its various disparity positions, are recorded for subsequent display, which produces a three dimensional illusion when viewed on a conventional display with the unaided eye. The size of the lens aperture and the parallax scanning pattern are adjustable to suit conditions. The lens aperture may be defined by a through-hole in an opaque card, a plurality of interleaved leaf elements, or a planar array of cells switched between transparent and opaque states. In addition to stereoscopic imaging, the moving lens aperture principle of the present invention may be utilized in range-finding and camera image stabilization applications.

27 Claims, 12 Drawing Sheets

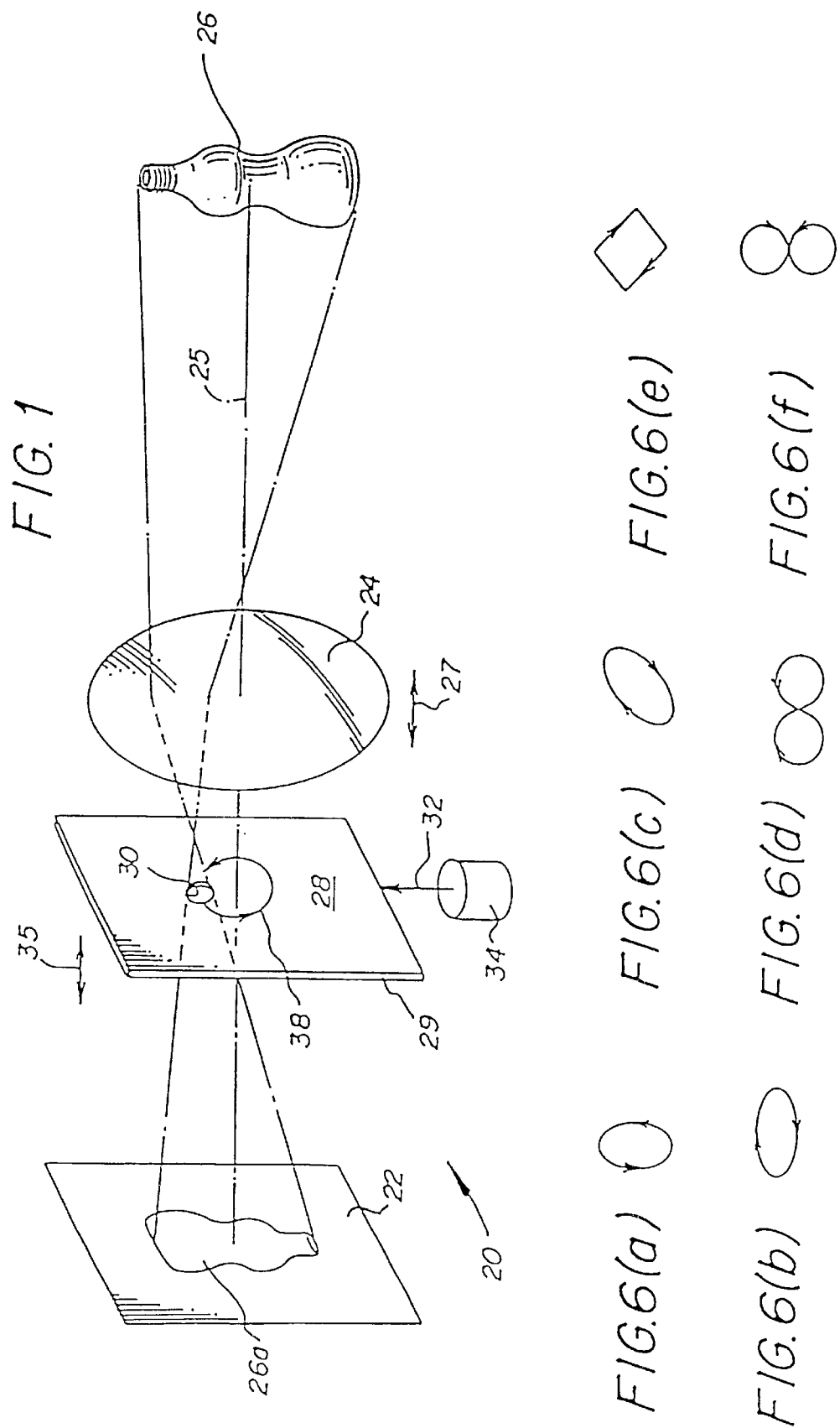

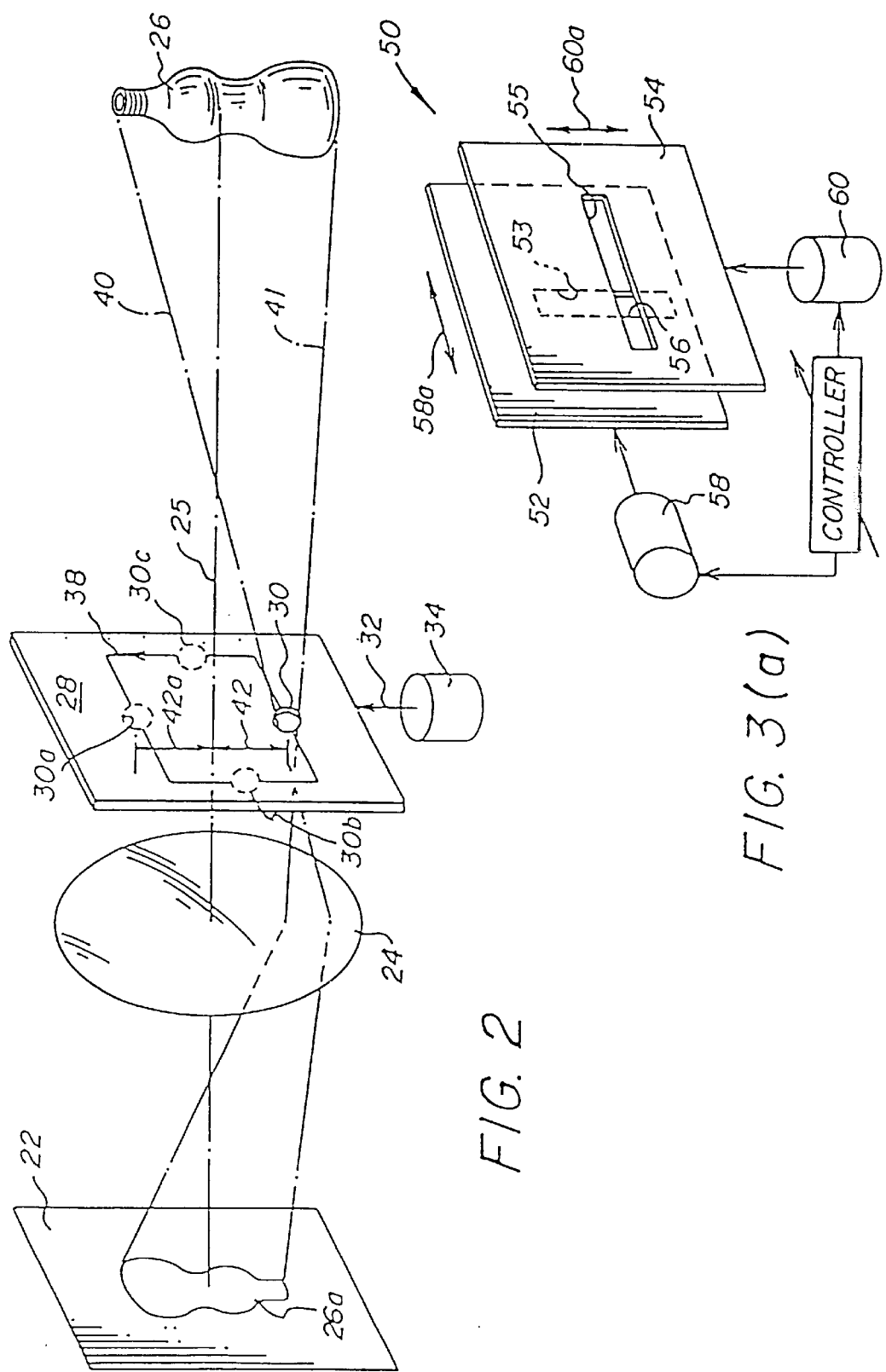

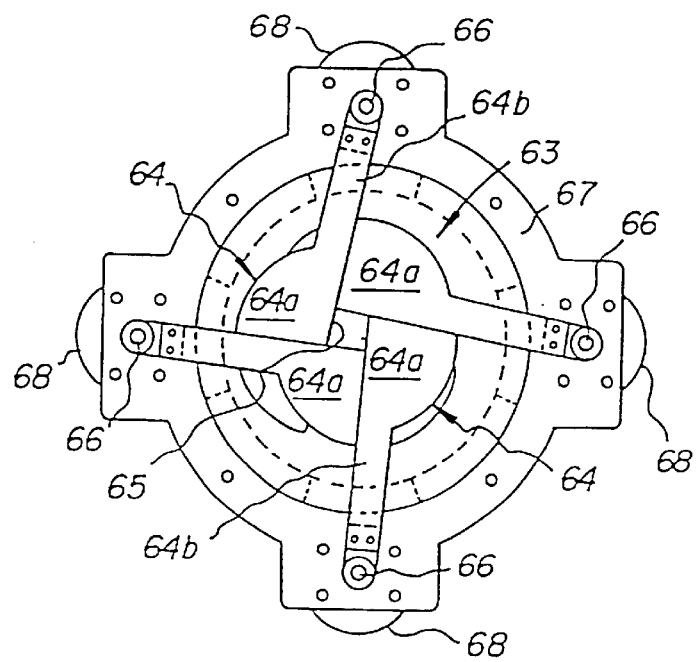
FIG. 3(b)
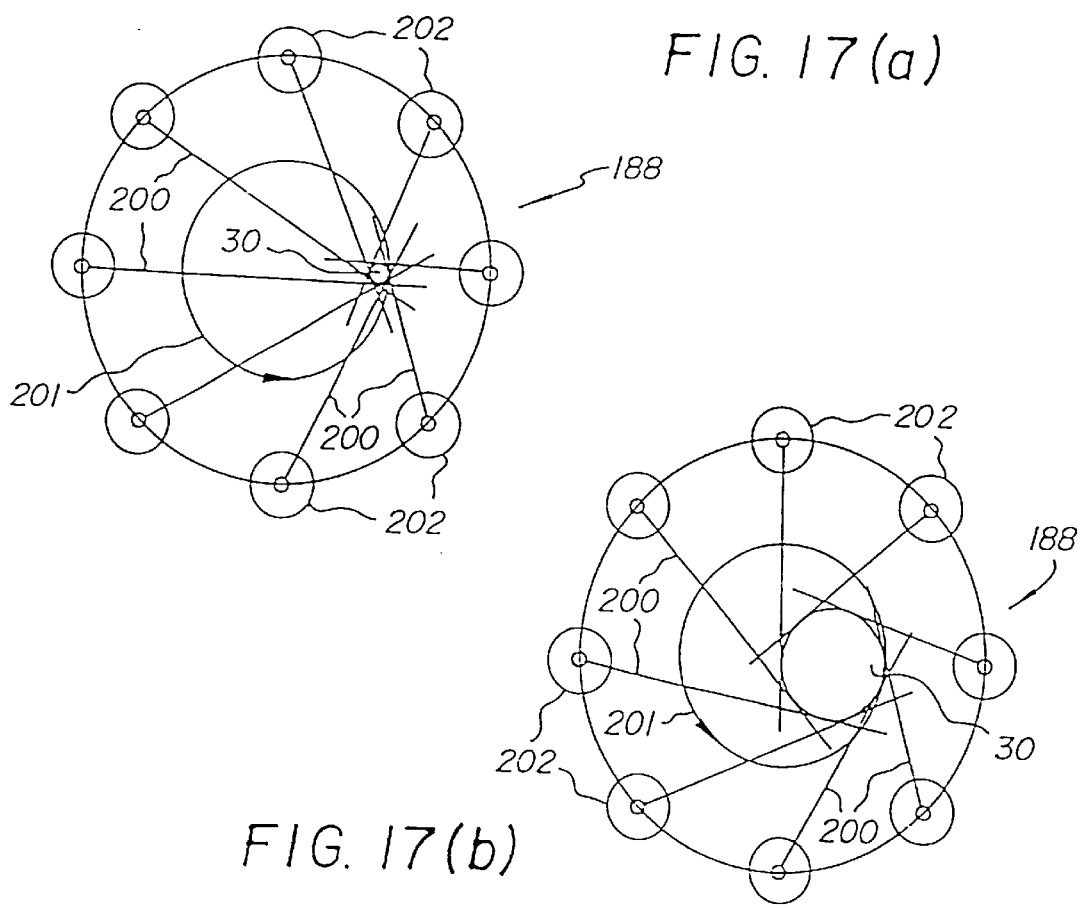
FIG. 17(a)
FIG. 17(b)

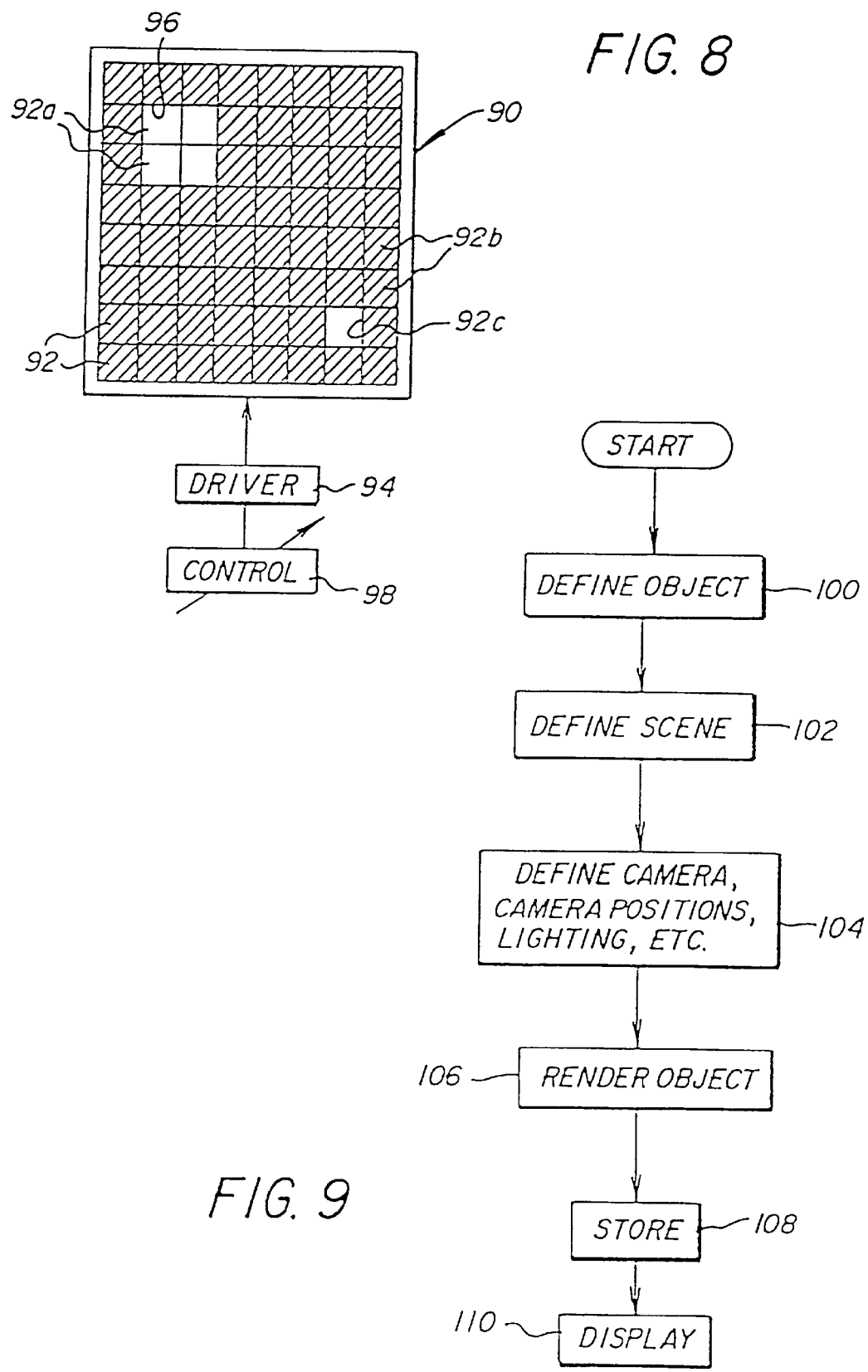

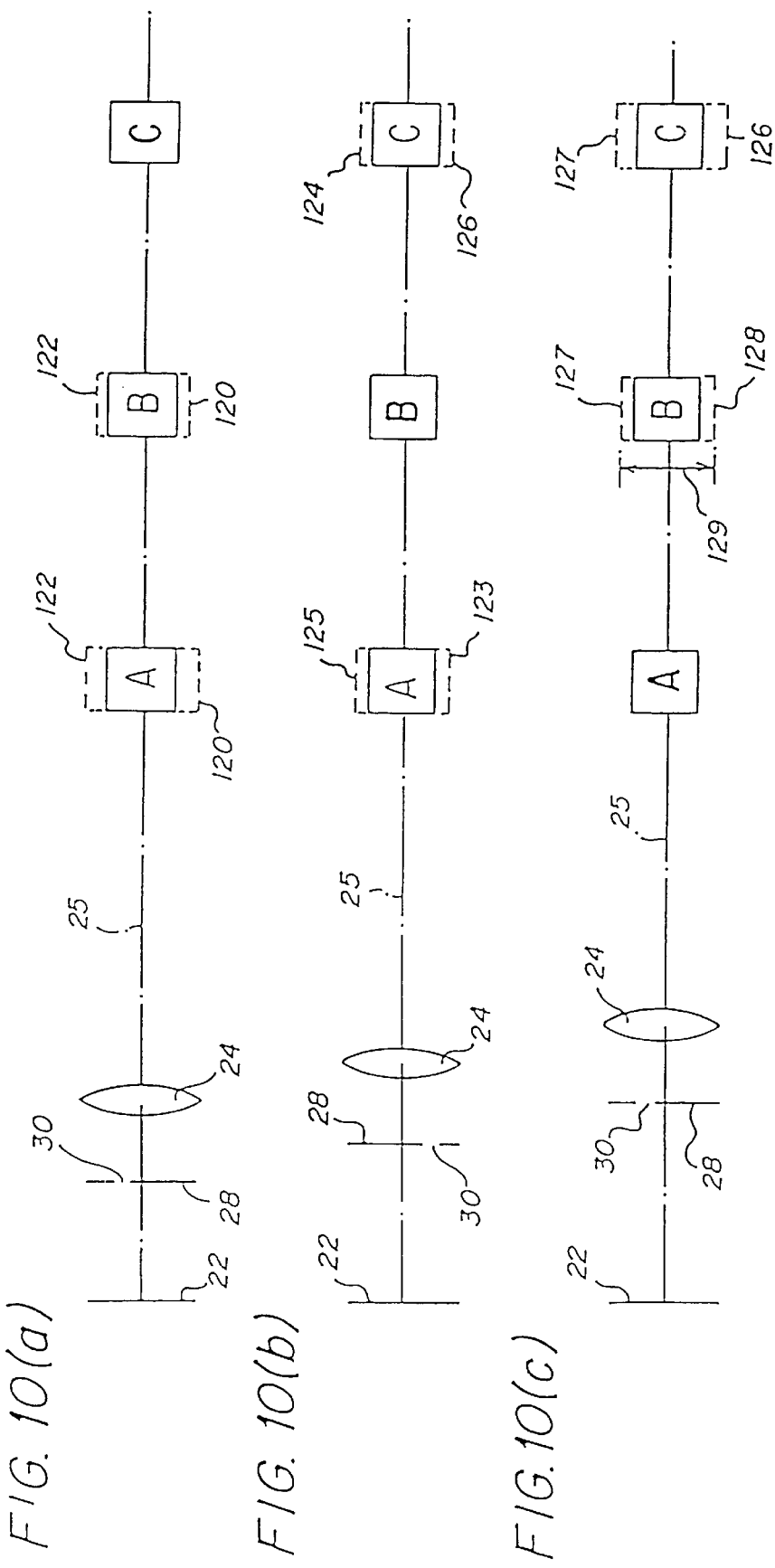

AUTOSTEREOSCOPIC IMAGING APPARATUS AND METHOD USING A PARALLAX SCANNING LENS APERTURE

REFERENCE TO RELATED APPLICATION

This application is a divisional of application 08/902,958, filed Jul. 30, 1997, now U.S. Pat. No. 5,991,551; which is, in turn, a continuation of application 08/358,176, filed Dec. 16, 1994, now U.S. Pat. No. 5,678,089; which is, in turn, a continuation-in-part of application 08/148,916, filed Nov. 5, 1993, now U.S. Pat. No. 5,448,322, all of which are incorporated herein by reference.

BACKGROUND OF THE INVENTION

1. Field of the Invention

The present invention relates to a stereoscopic apparatus and method for producing images that can be displayed as three-dimensional illusions and more particularly to an autostereoscopic imaging apparatus and method for producing images that, on display, can be perceived to be three-dimensional without the use of special display devices or viewing aids.

2. Background Information

The production of two-dimensional images that can be displayed to provide a three-dimensional illusion has been a long standing goal in the visual arts field. Methods and apparatuses for producing such three-dimensional illusions have to some extent paralleled the increased understanding of the physiology of human depth perception.

Binocular (stereo) vision requires two eyes to view a scene with overlapping visual fields. Each eye views a scene from a slightly different parallax angle and focuses the scene onto a retina. The two-dimensional retinal images are transmitted by optic nerves to the brain's visual cortex, where they are combined, in a process known as stereopsis, to form a three-dimensional model of the scene.

Depth perception of three-dimensional space depends on various kinds of information (cues) perceived from the scene being viewed, such as relative size, linear perspective, interposition, light and shadow, gradients (monocular cues), as well as retinal image size, retinal disparity, accommodation, convergence (binocular cues), and familiarity with the subject matter of the viewed scene (learned cues).

True three-dimensional image displays can be divided into two main categories, stereoscopic or binocular and autostereoscopic. Stereoscopic techniques (including stereoscopes, polarization, anaglyphic, Pulfrich, and shuttering technologies) require the viewer to use a viewing device, such as polarized glasses. Autostereoscopic techniques do not. Some autostereoscopic techniques, such as holography, lenticular screens and parallax barriers require special display devices. Others, such as alternating-pairs and parallax scans require neither special viewing devices nor special display devices.

For example, prior art autostereoscopic television and motion picture systems have utilized the approach of alternately displaying views of a scene recorded by two cameras from different points of view using a conventional display device, i.e., a display device not uniquely designed to provide or assist in providing a three-dimensional illustration. U.S. Pat. No. 4,006,291 to Imsand; U.S. Pat. Nos. 4,303,316 to McElveen; U.S. Pat. No. 4,429,328 to Jones et al.; U.S. Pat. No. 4,966,436 to Mayhew & Pritchard, all utilized two cameras to record horizontally, vertically, or a combination of horizontally and vertically displaced views of a scene. While this autostereoscopic approach produces images which provide three-dimensional illusion when displayed with a conventional display device, precision matching of the two cameras is required. Improper alignment of the cameras, lens mismatches in focal length and/or focus, chrominance and illuminance mismatches, and misplaced convergent points, all contribute to image instability. Also, considerable operator skill is required to continuously adjust disparity and convergence of the two cameras in a coordinated manner to maintain a stable image.

Image instability can be rendered less noticeable by the use of masking techniques. Camera motion is very effective in hiding rocking motions of images, apparently because the brain places less importance on rocking motion than on camera motion. This could result from some sort of natural stabilizing phenomena or mechanism of the brain that allows us to see clearly while walking or running, when images would otherwise bounce.

To avoid the drawbacks associated with a two-camera autostereoscopic system, autostereoscopic methods and apparatuses using a single camera/single lens have been developed. Mayhew et al. U.S. Pat. Nos. 5,014,126 and 5,157,484 disclose single camera autostereoscopic systems capable of recording images which, when displayed on a conventional device, are perceived by a viewer in three-dimension. Commonly assigned, copending U.S. patent application Ser. No. 08/115,101, filed Sep. 2, 1993 by Fernekes et al. discloses a method and apparatus, wherein a single camera records images while undergoing parallax scanning motion. The disclosures of the Mayhew et al. patents and the Fernekes et al. application are incorporated herein by reference.

As more fully described in these references, the optical axis of a single camera is made to move in a repetitive pattern which causes the camera optical axis to be offset from a nominal stationary axis. This offset produces parallax information. Motion alone is such a pattern is referred to as parallax scanning motion. As the motion repeats the pattern, the motion, in effect, becomes oscillatory, with each completion of the pattern being considered a scan cycle.

The pattern may be repeated with each cycle, or many change. In either event, there is a need to coordinate the rate each cycle is repeated by the camera (scanning cycle rate) and the rate that images recorded during each cycle are displayed (view cycle rate). The view cycle rate is the rate of display of the parallax information produced during each scan cycle and, to achieve optimum results, should fall in the range of 3 to 6 view cycles per second, although satisfactory results might be achieved at a rate as low as 2 view cycles per second, or as high as 15 view cycles per second.

In the case of a single camera moving in a vertical plane from a top point to a bottom point of view, the resulting parallax scanning motion may be considered as following the circumference of a circle as seen from the circle's edge. One complete circle would be considered one complete parallax scanning pattern. The display device would then be coordinated to display each corresponding complete circle of images at the rate of 3 to 6 Hz. The frame rate of the camera would dictate the number of complete images shown per view cycle.

While the single camera autostereoscopic imaging systems disclosed in the above cited prior art are effective in producing high quality, stable images that can be perceived in three-dimension when viewed on a conventional display device with the unaided eye, unfortunately these systems employ recording apparatus which are rather bulky and heavy, relatively complex in construction, and consume a meaningful amount of power in operation.

SUMMARY OF THE INVENTION

A principle objective of the present invention is to provide improved method and apparatus for producing images in two-dimension that, upon display with a conventions device, can be perceived as three-dimensional with the unaided eye. The method and apparatus of the invention utilize an autostereoscopic approach to three-dimensional imaging, thus avoiding the drawbacks inherent in the stereoscopic approach. The autostereoscopic method and apparatus of the present invention utilizes a single imaging device, such as a motion picture or video camera, and thus the disadvantages of a two-camera autostereoscopic approach are avoided. Moreover, since motion of the imaging device or its imaging lens is not required to obtain parallax information, the apparatus of the present invention is compact in size and light weight, efficient in construction and operation, and convenient to implement in conventional motion picture and video cameras.

To achieve these objectives and advantages, the improved single-camera autostereoscopic imaging method of the present invention comprises the steps of providing an imaging lens having an optical axis directed toward a scene, providing a lens aperture, moving the aperture relative to the lens in a parallax scanning pattern through diverse disparity points displaced from the optical axis of the lens, generating a succession of time-spaced images of the scene as viewed through the aperture from a plurality of the disparity points, and recording the images. This method can be practiced using an imaging device, such as a conventional motion picture camera or a video camera, or a computer suitably programmed to simulate the lens, the aperture and the lens aperture motion. The display device may be conventional, and no viewing glasses are required. The resultant images are displayed at a rate such that three to six of the parallax scanning patterns are viewed per second.

The apparatus of the present invention, includes an imaging plane, a lens for focusing images of objects in a field of view on the imaging plane, an optical element positioned adjacent or as part of the lens and providing an aperture, and an actuator for oscillating the optical element so that the aperture follows a parallax scanning pattern relative to the optical axis of the lens. A succession of time-spaced recordings are made of the object images focused on the imaging plane, as viewed through the aperture from a plurality of different parallax views or disparity points or segments offset from the lens optical axis. Again, the repetition rate of the parallax scanning pattern is coordinated with a conventional display device so as to display 3 to 6 complete parallax scanning patterns per second.

By virtue of the method and apparatus of the present invention, display of the two-dimensional image recordings by a conventional display apparatus, e.g., projector (film) or TV receiver (video tape) in corresponding time-spaced succession can be perceived as a three-dimensional illusion. As noted above, optimum results are achieved when the parallax information is displayed at a view cycle rate of 3 to 6 Hz. There is no requirement for any special display or for viewing glasses.

The single camera autostereoscopic imaging method and apparatus of the present invention are readily conducive to numerous modifications. The aperture may be located in front of or behind the lens or between lenses of a multiple lens set. The aperture may take a variety of sizes and shapes, be adjustable in size according to scene lighting and/or have different edge characteristics. Furthermore, more than one aperture may be utilized. The pattern of the parallax scanning motion of the aperture may be of a variety of configurations ranging from circular to rectangular to complex lissajous patterns. Preferably, the rate of parallax scanning motion of the lens aperture is set to result in a view cycle rate of 3–6 Hz. For special effects, such as fast motion and slow motion, the lens aperture scanning cycle rate would be increased or decreased corresponding to the rate at which images are taken, in order to maintain the required 3–6 Hz view cycle rate when displayed. The optical element may take the form of one or more opaque cards having one or more through-holes or slits serving to create a lens aperture. Also, the optical element can be implemented as a liquid crystal panel or a ferro-electric panel (spatial light modulator) providing a matrix array of cells that can be selectively switched between opaque and transparent states.

Moreover, depth information derived from the images of objects viewed through the lens aperture during parallax scanning motion can be utilized in range finding applications. In addition, controlled lens aperture movement can be utilized to compensate for spurious camera motion and thus stabilize image recordings.

According to another feature of the present invention, the scanning lens aperture is incorporated in a relay lens installed between a conventional camera body and the conventional camera lens system, thereby permitting implementation of the present invention without modifications to either the camera body or the camera lens system.

It is to be understood that both the foregoing general description and the following detailed description are exemplary and are intended to provide further explanation of the invention as claimed.

The accompanying drawings are included to provide a further understanding of the invention and are incorporated in and constitute part of this specification, illustrate embodiments of the invention and together with the description serve to explain the principles of the invention.

BRIEF DESCRIPTION OF THE DRAWINGS

FIG. 1 is a perspective view, partially in schematic form, illustrating one it embodiment incorporating the teachings of the present invention.

FIG. 2 is a perspective view, partially in schematic form, illustrating an alternative embodiment incorporating the teachings of the invention.

FIGS. 3(a) and 3(b) are perspective and front views, respectively, of alternative forms of optical elements that can be utilized in the embodiments of FIGS. 1 and 2.

FIGS. 6(a)–6(f) illustrate alternative parallax scanning patterns that may be executed by the optical elements in FIG. 14.

FIG. 8 is a front view of an alternative optical element usable in the embodiments of FIGS. 1, 2 and 4.

FIG. 9 is a flow chart illustrating an application of the present invention to computer generated imaging.

FIGS. 10(a)–10(c) are schematic diagrams illustrating the operation of the autostereoscopic imaging apparatus incorporating the teachings of the present invention.

FIGS. 17(a) and 17(b) are diagrammatic views of a lens aperture-defining optical element included in the relay of FIG. 14;

Like reference numerals refer to corresponding parts throughout the several view of the drawings.

DETAILED DESCRIPTION

Figure 4:
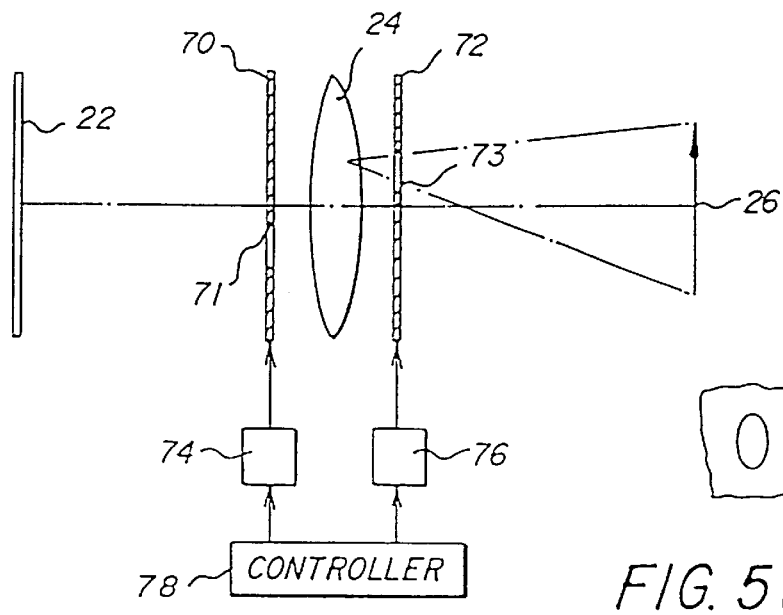
FIG. 4 is a side view, partially in schematic form, of another embodiment incorporating the teachings of the invention.

In the embodiment of the autostereoscopic imaging apparatus of the present invention disclosed in FIGS. 1–8 a succession of time-spaced images of a scene are recorded by a single imaging device in a manner such that a subsequent display of the images can be perceived as three-dimensional. Thus, autostereoscopic imaging apparatus 20 of FIG. 1 includes an imaging plane 22 of a suitable imaging device such as a conventional film camera or video camera. For example, imaging plane 22 may represent the film plane of a conventional film camera or a CCD array of a conventional video camera. FIG. 1 also illustrates a lens 24, scene object 26, and an optical element 28. Camera lens 24 may comprise a set or system of multiple lens elements. Lens 24 has an optical axis 25 which is directed at distant object 26 in a scene to be imaged. In a conventional manner, the position of lens 24 is adjusted forwardly or rearwardly, as indicated by arrow 27, along its optical axis to focus an image 26a of object 26 on imaging plane 22.

Optical element 28, consisting of an opaque card 29 in which is formed a through-hole or aperture 30, is shown in FIG. 1 positioned between object 26 and imaging plane 22. Moreover, in FIG. 1 optical element 28 is positioned immediately behind lens 24, i.e., between the lens and imaging plane 22, while in FIG. 2 optical element 28 is positioned immediately in front of lens 24. Preferably, the optical element is located as close as possible to the lens iris (not shown) which can be positioned between lenses of a multiple lens set typically used in a camera. Ideally, optical element 28 would assume the position of and replace the lens iris of a conventional camera lens 24 and, therefore, would actually be positioned as a part of the lens itself. Thus, to say the optical element is adjacent the lens is intended to include the condition wherein the optical element is forward, behind or a part of the lens.

The optical element is shown in FIG. 1 to be mechanically linked, as schematically indicated at 32, to an actuator or motor 34 which operates to move aperture 30 in a parallax scanning pattern relative to lens optical axis 25. A circular parallax scanning pattern for aperture 30 is illustrated by arrow 36 in FIG. 1, while a rectangular scanning pattern is illustrated by arrow 38 in FIG. 2. Other parallax scanning patterns are illustrated in FIGS. 6(a)–6(f). Normally the aperture scanning patterns are centered about lens optical axis 25, however, under certain conditions, desirable visual effects can be achieved when the scanning pattern is off-centered relative to this optical axis. While scanning patterns will typically result in horizontal (X) and vertical (Y) coordinate aperture motions in the plane of optical element 28 and transverse to optical axis 25, it will be understood that Z coordinate aperture motion parallel to the optical axis, as illustrated by arrow 35 in FIG. 1, may be introduced in conjunction with X and Y coordinate motions for special effects and to mask motion artifacts. A controller 35 activates actuator 34 to produce movement of aperture 30 according to a particular parallax scanning pattern selected by a user of the autostereoscopic imaging apparatus.

In polar coordinate terminology, a parallax scanning pattern may be defined as the patterned traced by the head of a rotating vector whose tail is fixed along the lens optical axis. The length and rate of rotation may be varied. Preferably, the rate of rotation is maintained in a range such that, when the resultant images are displayed on a conventional display, the vector has the appearance at the display of having rotated at a rate of 3 to 6 Hz.

With reference to FIG. 2, it is seen that light rays 40 from the top of object 26 pass through aperture 30 and are redirected by lens 24 toward a lower location on imaging plane 22 where a focused image of the object top is formed. Similarly, light rays 41 from the bottom of object 26 pass through aperture 30 and are redirected by the lens toward an upper location on the imaging plane where a focused image of the object bottom is formed. Light rays from object portions between the object's top and bottom likewise pass through aperture 30 and lens 24 to complete the formation of focused image 26a. If an image 26a is recorded while aperture 30 is in the position shown in FIG. 2, it is seen that the point of view of this image has a vertical disparity represented by arrow 42 which is equal to the vertical offset distance of aperture 30 below optical axis 25. If the object image is recorded while the aperture is in phantom line position 30a indicated in FIG. 2, the point of view of the resultant image has a vertical disparity equal to the vertical offset of aperture position 30a above the optical axis 25 as represented by arrow 42a. Similarly, image recordings taken while aperture 30 is in phantom line positions 30(b) and 30(c) have horizontal disparities equal to the corresponding aperture horizontal offsets from the optical axis 25. The term "position" in the context of this invention includes not only a point along a parallax scanning pattern, but also a segment of that pattern traversed as an image is recorded.

Disparity, whether horizontal or vertical or components of both, is largely responsible for adding parallax to visual images. Portions of object volumes having essentially flat surfaces produce images which appear flat and two-dimensional. While changes in the viewing perspective do not change the appearance of these portions, the appearance of their spatial relationships to other objects in the scene does change. However, portions of a object volume naturally having depth when viewed directly, do change their appearance or, more specifically, their position and aspect, as the viewing perspective is changed. Changes in the viewing perspective create corresponding edges on the image which do not perfectly match when the images are superimposed. Alternatively displaying these images creates contrast at these edges which is perceptible to the brain as depth.

Figure 5A:
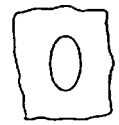
FIGS. 5(a)–5(d) illustrate various aperture configurations that may be utilized in the embodiments of FIGS. 1 and 2.
Figure 5B:
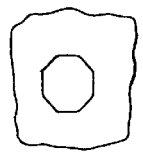
Figure 5C:
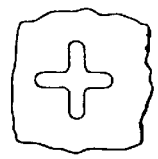
Figure 5D:
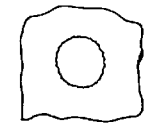

FIG. 3(a) illustrates an alternative embodiment of an optical element, generally indicated at 50, for use in the apparatus of FIGS. 1 and 2. This optical element includes a pair of opaque cards 52 and 54 arranged in juxtaposed, parallel relation. Card 52 is provided with a vertically elongated, rectangular slit 53, while card 54 is provided with a horizontally elongated, rectangular slit 55. At the intersection of slits 53 and 55, a rectangular lens aperture 56 is created. An actuator 58 reciprocates card 52 in the horizontal direction, as indicated by arrow 58a, and an actuator 60 reciprocates card 54 in the vertical direction, as indicated by arrow 60a. The reciprocations of actuators 58 and 60 are adjustably controlled by a controller 62, which may include a microprocessor and associated actuator drive circuits; the microprocessor being, in turn, controlled by inputs from the user of the apparatus. It is seen that, by virtue of the relative motions the cards, scanning motion of aperture 56 is produced. By adjusting amplitude, frequency, and phase of the card reciprocating motions, the parallax scanning patterns illustrated in FIGS. 1, 2 and 6(a)–6(f), as well as many other patterns, are readily achieved by the controlling action of controller 62. While the lens aperture configuration is circular in FIGS. 1 and 2 and rectangular in FIG. 3, it may take other shapes, such as, for example, elliptical as illustrated in FIG. 5(a), octagonal as illustrated in FIG. 5(b), and cruciform as illustrated in FIG. 5(c). FIG. 5(d) illustrates that the lens aperture may have a soft or frayed edge, rather than a hard or sharp edge.

FIG. 3(b) illustrates yet another embodiment of an optical element, generally indicated at 63, for use in the apparatus of FIGS. 1 and 2. This optical element includes four leaves, generally indicated at 64, each having an opaque semicircular free end portion 64a and a radially outwardly extending arm 64b. The end portions 64a are arranged in partially lapped (interleaved) relation to define a lens aperture 65 of generally rectangular shape. The outer ends of arms 64(b) are fixed to pins 66 rotatably mounted by an annular mounting plate 67 at quadrature positions. Each pin is driven by a separate galvanometer motor 68 mounted to plate 67. It is seen that, by controllably energizing the galvanometer motors, the leaves 64 can be pivoted clockwise and counterclockwise to respective positions defining the opening size and location of lens aperture 65. By selectively oscillating the leaves 64 in phased relation, movement of the lens aperture 65 along a desired scanning pattern is achieved.

Regardless of the lens aperture configuration, it is important that it be bordered throughout by the opaque material of the optical element 28. Also, the parallax scanning pattern of the lens aperture should remain within the effective aperture of lens 24, which typically corresponds to 80% of the lens diameter. Thus, the size of lens aperture 30 should be significantly less than the size of the full effective aperture (lens speed) of the lens, so that the lens aperture can assume disparity positions of sufficiently different viewing perspectives (disparity) needed to provide depth perception. It will thus be appreciated that, as the size of lens aperture 30 increases, the depth of field and disparity will all decrease. Conversely, smaller lens aperture sizes provide larger depths of field, and accommodate greater disparities.

While the embodiments of FIGS. 1–3 utilize a single parallax scanning aperture, plural apertures may be utilized. As seen in FIG. 4, a pair of optical elements 70 and 72 are respectfully formed with lens apertures 71 and 73. Optical element 70 is positioned behind lens 24, and optical element 72 is positioned in front of the lens. Optical element 70 is oscillated by an actuator 74, while optical element 72 is oscillated by an actuator 76. These actuators are controlled by a controller 78 to produce parallax scanning motions of apertures 71 and 73. One of apertures 71 and 73 (e.g. aperture 73) is larger than the other, such that they are at least partially aligned during scanning motions of the apertures to allow image light to pass through to the imaging plane 22. The scanning patterns of the two lens apertures may be of the same or different configurations and may be in synchronism with or independent of each other. The use of two parallax scanning apertures may be used for special effects and/or to mask a motion artifacts of object 26 as imaged on imaging plane 22. Alternatively, one of the apertures may be moved according to a particular parallax scanning pattern, while the other aperture is moved in a manner to provide image stabilization, such as described in connection with the embodiment of FIG. 12.

Figure 7:
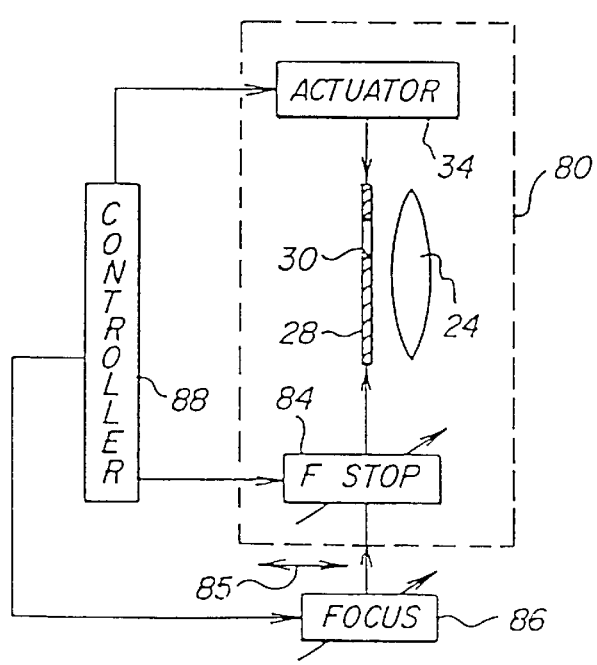
FIG. 7 is a schematic diagram illustrating various controls that would typically be applied to the autostereoscopic imaging embodiments of FIGS. 1 and 2 in practicing the present invention.

FIG. 7 illustrates lens 24, optical element 28 and actuator 34 carried by a lens holder 80, schematically illustrated in phantom line. Also included on lens holder 80 is an F stop adjustor 84 for adjusting the size of lens aperture 30 in accordance with available light and desired depth of field. Lens holder 80 is moved fore and aft (arrow 85) by focus adjustor 86. A controller 88 may be provided to control actuator 34 to a desired parallax scanning motion for lens aperture 30 in terms of pattern configuration, size, and cycle rate. Controller 88 also controls F stop adjustor 84 to a desired lens aperture size and controls focus adjustor 86 to bring into focus a desired subject in the field of view. With regard to scanning pattern size, controller 88 preferably operates to increase or decrease the pattern size in accordance with the range of the closest object of interest in the scene. Since pattern size determines the degree of parallax or disparity (optical axis offset) of the points of view along the scanning pattern, it is desirable to reduce the pattern size (decrease optical axis offset) when recording images of objects at close range and increase the pattern size (increase optical axis offset) when recording images of objects at long range. For example, if the scanning pattern is circular, as illustrated in FIG. 1, patter size would be reduced by decreasing the diameter of the circle pattern, and increased by increasing the circle pattern diameter. If the recording apparatus moves through a segment of the parallax scanning pattern for each image, the "point of view" of that image may be considered to be an average of the points traversed in this segment.

Controller 88 may be in the form of a microprocessor responsive to user inputs for establishing the optimum camera and scanning pattern parameters according to scene conditions. Alternatively, known autofocus and autoexposure techniques can be utilized to automatically adjust F stop and focus settings to a particular scene situation and also to send signals indicative of these settings to controller 88, which then activates actuator 34 accordingly to appropriately adjust the lens aperture scanning pattern.

A parallax scanning cycle corresponds to a complete excursion of a particular parallax scanning pattern by the lens aperture starting from an arbitrary position in the pattern and returning to the same arbitrary position, which is also the starting position of the next scanning cycle. During each parallax scanning cycle, images are recorded at the frame rate of the imaging device, normally 24 frames per second (fps) in the case of a film camera and 60 Hz in the case of an NTSC video camera (50 Hz in the case of PAL and SECAM video cameras).

The rate or elapsed time for each parallax scanning cycle of the lens aperture is set to produce a corresponding view cycle rate within the ideal 3–6 Hz range for optimum autostereoscopic perception when the recorded images are displayed. This 3-6 Hz range has been determined to correspond to the optimum range of the video-psychological memory rate of the human brain. That is, when both eyes of a viewer are presented with a sequence of differing parallax views (i.e., from different locations along a parallax scanning pattern) that undergo a 3–6 Hz view cycle rate, parallax information is provided to the viewer in the form that is naturally translated by the brain into a perceivable three-dimensional image. When the view cycle rate is less than 3 Hz, noticeable rocking of the objects in the scene may occur; and display quality, as well a depth perception, is diminished. This is because images of a given object in the scene persist in the brain, rather than blend to form a depth-enhanced composite image. View cycle rates faster than 6 Hz also cause depth quality to become less perceptible. However, a range of 2 Hz to 15 Hz may nevertheless provide usable depth perception of satisfactory quality depending on the content of the scene and the particular display being utilized.

When a live action (real time) autostereoscopic display of the scene is desired, the parallax scanning cycle rate is selected to result in a view cycle rate within the 3–6 Hz range. Thus, in the case of a conventional film camera recording images at a rate of 24 fps, if the parallax scanning cycle rate of the lens aperture 30 is, for example, 4 Hz, 6 frames of the scene image will be recorded from 6 different parallax positions during each parallax scanning pattern cycle. Then when a film strip recording of the scene images is projected on a screen by a conventional projector at a rate of 24 fps, motions of subjects in the scene will appear at normal speed. Moreover, since the parallax information, recorded on the filmstrip at a parallax scanning cycle rate of 4 Hz, is projected on the screen at a view cycle rate of 4 Hz, the parallax information can be translated to depth information by the brain, such that the scene, despite being displayed on a two-dimensional screen, can be view autostereoscopically in real time, i.e., a three-dimensional illusion viewable with the naked eye (without viewing aids).

When it is desired to film a scene in slow motion, the film camera frame rate may be increased to, for example, 120 fps, but the filmstrip still is projected at a 24 fps for display. Since the projection frame is one-fifth the camera frame rate, a slow motion display effect of moving objects in the scene is achieved. However, if the parallax scanning cycle rate of lens aperture 30 remains at 4 Hz, the depth information in the projected scene is at a 0.8 view cycle rate, well below the optimum 3–6 Hz range If the parallax scanning cycle rate of lens aperture 30 is increased to 20 Hz, the view cycle rate, with images displayed at 24 fps, rises to 4 Hz for optimum autostereoscopic viewing.

Conversely, to film a scene in fast action, the parallax scanning cycle rate is decreased in the same proportion as the imaging frame rate of the camera is decreased, such that subsequent projection of the filmstrip at a 24 fps displays the scene in fast motion. However, the view cycle rate remains at 4 Hz for optimum autostereoscopic viewing.

The same relationship between lens aperture parallax scanning cycle rate and view cycle rate applies in the case of a conventional NTCS video camera operating at 60 interlaced scanning fields (half pictures) per second and thus a frame rate of 30 Hz (full pictures). For live action recording using a conventional video camera, if the lens aperture parallax scanning cycle rate is set at 4 Hz, 15 image fields will be recorded from 15 different parallax positions during each of the parallax scanning cycles. Then, when the scene fields are displayed on a conventional TV receiver at 60 Hz, the images are displayed at a view cycle rate of 4 Hz.

Preferably, the lens aperture parallax scanning cycle rate is set at a value that is not a multiple of the imaging frame rate of the camera, such that scene images are not recorded at the same points in a particular parallax scanning pattern, cycle after cycle. Thus, for live action, a lens aperture parallax scanning pattern rate of 4.31 Hz for a conventional film camera has been found to achieve a particularly high quality autostereoscopic display on a screen using a conventional film projector.

It is believed that the display quality of the autostereoscopic scene image can be enhanced by executing parallax scanning motion of the lens aperture 30 intermittently, that is, only while the camera shutter is open, rather than continuously. In this case, controller 88 of FIG. 7 would control actuator 34 to move lens aperture 30 along a segment of a particular parallax scanning pattern while the camera shutter is open to record a scene image and then halt the lens aperture scanning motion as the camera shutter closes. When the shutter opens again, the lens aperture is scanned along the next segment of the parallax scanning pattern and stopped when the shutter closes again. It will be appreciated that, to maintain a desired lens aperture parallax scanning pattern rate, the speed of the lens aperture motion along each parallax scanning pattern segment will have to be at a greater speed than the movement of the lens aperture during the continuous scanning approach. This intermittent scanning approach eliminates the gaps in the image frame recordings that occur when the lens aperture parallax scanning motion is continuous. When the image frames are displayed, any foreground and background motion will appear continuous. Thus, annoying strobing effect titter) of any foreground and background motion is avoided. Instead, enhanced blurring (relative to the continuous parallax scanning motion approach) of foreground and background motion will be achieved to more effectively mask these motion artifacts. Moreover, it is also believed that the apparent motion of foreground and background objects (described below with reference to FIGS. 10(a)–10(c)) produced by the differing parallax views taken through the lens aperture will also be more effectively masked. Thus, the intermittent scan approach should permit the disparity (i.e., size) of the parallax scanning pattern to be increased for enhanced depth perception of objects in a particular scene, as compared to the continuous scan approach.

As illustrated in FIG. 8, an optical element can also be implemented as a liquid crystal or ferro-electric panel (spatial light modulator), generally indicated at 90. These panels include a matrix array of cells 92 which can be individually addressed and activated by a driver 94 to create one or more transparent cells 92a amongst a remainder of opaque cells 92b. The transparent cell or cells 92a thus constitute a lens aperture 96 which can be readily moved about in a variety of parallax scanning patterns, including those illustrated in FIGS. 6(a)–6(f), by driver 94.

It will be appreciated that driver 94 may be externally, manually or automatically controlled, as indicated at 98, to vary the size and shape of aperture 96, as well as the configuration of the parallax scanning pattern of the aperture. Moreover, as indicated at 92(*c*), driver 94 can readily introduce one or more parallax scanning or stationary lens apertures, in addition to aperture 96, to create special effects or to mask motion artifacts. Also, rather than abruptly switching the cells between transparent and opaque states, the transition may be effected somewhat gradually through progressively changing degrees of gray scale. In practice, driver 94 and controller 98 may be implemented by a suitably programmed digital computer.

The principles of the present invention may also be applied in the computer generation of images which then can be displayed in three-dimensional illusion. FIG. 9 illustrates the basis steps involved. In step 100, an object and object motion are defined in three-dimensional space, and a scene to include the object is also defined three-dimensional space in step 102. The imaging device or camera, camera position (points of view), illumination, range, etc., are defined in step 104. Camera definitions include simulations of an imaging plane, lens and lens aperture parameters, such as size and shape. In step 106 the image is rendered by simulating a desired parallax scanning pattern of the lens aperture using a suitable ray tracing algorithm, and the rendered images are stored in computer memory on a frame-by-frame basis (step 108) The stored images can then be retrieved from memory for display on a computer monitor, recorded on video tape for display on a TV screen and/or recorded on film for projection on a screen (step 110).

From the foregoing description, it will be noted that, since only the lens aperture undergoes parallax scanning motion while the lens 24 remains stationary, the point of view of the lens aperture is always convergent on the object to which the lens is focused. Thus, unlike prior single-camera autostereoscopic imaging apparatus, such as disclosed in, for example, the cited U.S. patent application Ser. No. 08/115, 101, a separate convergence adjustment is avoided in the apparatus of the present invention. That is, focus adjustment inherently establishes the appropriate convergence setting, which is an important feature of the present invention.

FIGS. 10(*a*)–10(*c*) are schematic diagrams illustrating how this important feature of the invention can be used to an advantage. In FIGS. 10(*a*), 10(*b*) and 10(c), objects A, B, and C represent objects at close range, mid-range, and far range, respectively, relative to imaging plane 22. If lens 24 is focused on far range object C, as depicted in FIG. 10(*a*), the image of this object appearing on imaging plane 22 remains stationary during parallax scanning motion of aperture 30. However, when aperture 30 moves upwardly to positions of vertical disparity above optical axis 25, for example, the image of objects A and B appearing on imaging plane 22 move downwardly, as indicated by phantom lines 120, relative to the stationary image of object C. Conversely, when aperture 30 moves downwardly to positions of vertical disparity below the optical axis, the images of objects A and B appearing on the imaging plane move upwardly, as indicated by phantom lines 122, relative to the stationary image of object C.

When lens 24 is focused on object B, as illustrated in FIG. 10(*b*), the image of this object remains stationary as aperture 30 undergoes parallax scanning motion. As the aperture scans upwardly, through positions of vertical disparity above optical axis 25, the image of object A appearing on imaging plane 22 moves downwardly, as indicated in phantom line at 123, relative to the stationary image of object B, while the image of object C appearing on the imaging plane moves upwardly, as indicated in phantom line at 124, relative to the object B stationary image. When the aperture moves downwardly through positions of vertical disparity below optical axis 25, the reverse conditions obtain, i.e., the image of object A moves upwardly (phantom lines 125), and the image from object C moves downwardly (phantom lines 126) relative to the stationary image of object B.

If lens 24 is focused on close range object A, the images of objects B and C move upwardly, as indicated by phantom lines 127, relative to the stationary image of object A, when aperture 30 scans through vertical parallax positions above optical axis 25. Conversely, the images of objects B and C move downwardly, as indicated in phantom line at 128, relative to the stationary image of object A when the lens aperture moves through vertical disparity positions below the optical axis.

This phenomena of apparent relative motions of images of objects in the lens field of view observed during parallax scanning motion of lens aperture 30 can be utilized to advantage in range finding applications. Considering FIG. 10(*c*), assume that aperture 30 is scanned between positions of maximum vertical disparity (maximum offset from optical axis 25) to maximize the image motion of object B relative to the stationary image of object A to which the lens 24 is focused. If the distance between object A and a camera reference point, such as imaging plane 22, is known, the distance between object A and object B can be determined from the magnitude of the motion of the object B image relative to the object A image or from the peak-to-peak amplitude, indicated at 129, of the object B image motion. Such determination can be accurately computer calculated by triangulation using recorded images of objects A and B taken, for example, from extreme disparity points above and below optical axis 25. Alternatively, the measured amplitude 129 of object B image motion produced by parallax scanning motion of the lens aperture between extreme vertical disparity points can be used to access a look-up table and thereby determine the separation between objects A and B. It will be appreciated that a rather close approximation of the range of objects A, B and C from imaging plane 22 can be obtained by adjusting the focus of lens 24 to any one of these objects until the image of this object becomes stationary as appearing on imaging plane 22. The object range can then be determined from the focus setting that completely quiets all motion of the object image as observed on the imaging plane or on a video screen displaying the object image.

Figure 11:
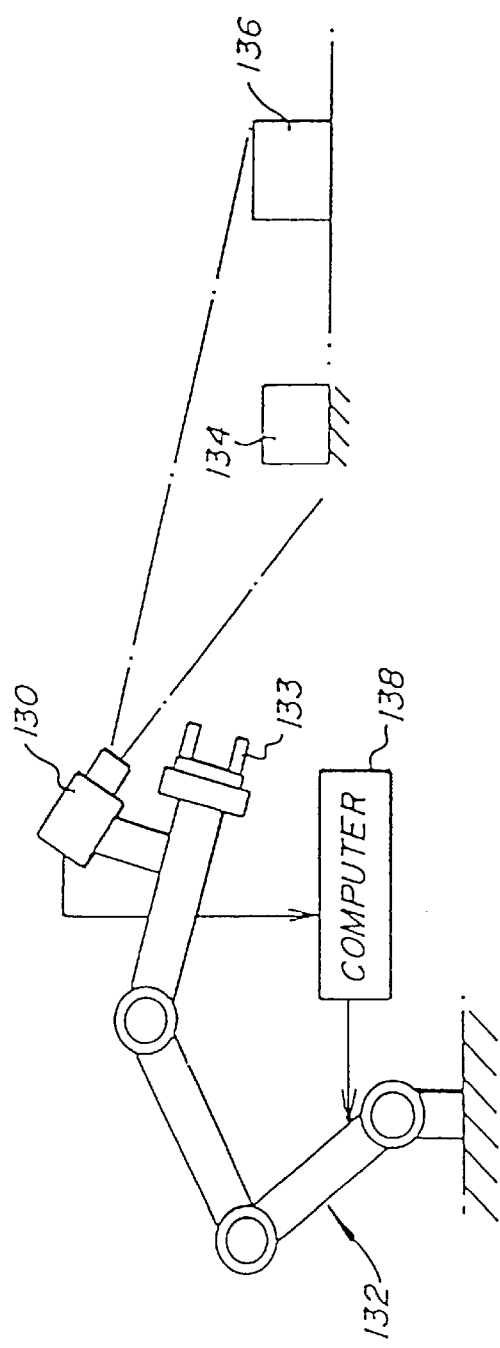
FIG. 11 is a schematic diagram illustrating the application of the teachings of the present invention to range finding.

FIG. 11 illustrates an application of the present invention to a range-finding video camera 130 mounted by a robotic arm, generally indicated at 132. The video camera, located on the robotic arm in a reference position, is oriented to view a scene including a stationary reference object 134 and a target object 136 which is to be griped by a hand 133 of the robotic arm. The distance between video camera 130 in its reference position and reference object 134 is known. When the camera lens is focused on reference object 134, images of the reference and target objects are recorded as the lens aperture undergoes parallax scanning motion. The recorded images are analyzed by a computer 138 to determine the range of the target object relative to the camera based on the magnitude of target image motion relative to the stationary reference image and the known distance between the camera and the reference object. Knowing the target object range, the computer can readily control the motion of robotic arm 132 to bring hand 133 rapidly into the grasping relation with target object 136. It will be appreciated that video camera 130 may be stationed at any fixed reference position a known distance from reference object 134, rather than being mounted by the robotic arm.

By virtue of the present invention, parallax information sufficient to determine target range can be acquired using a single imaging device, e.g., video camera. This is a distinct advantage over the conventional practice of using two video cameras or sets of parallax mirrors and prisms.

Figure 12:
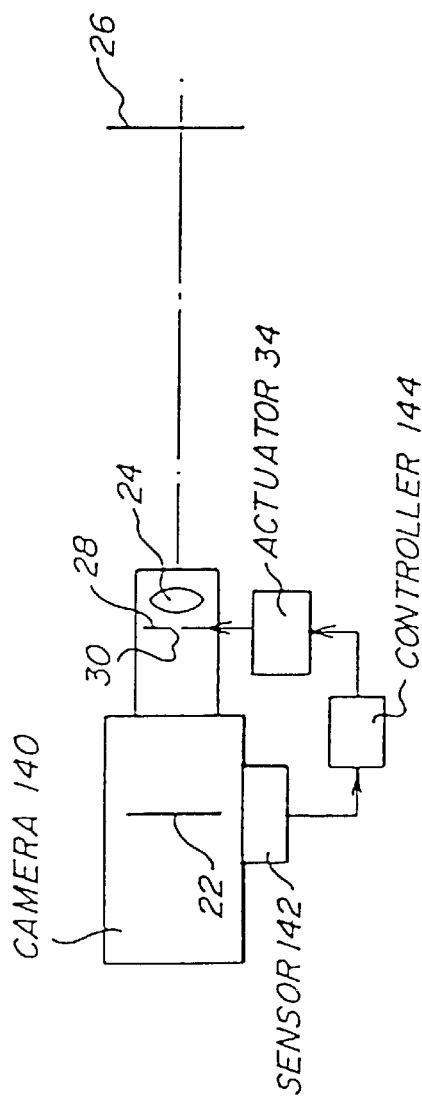
FIG. 12 is a schematic diagram illustrating the application of the teachings of the present invention to camera image stabilization.

Another application of the present invention is illustrated in FIG. 12, which utilizes a moving lens aperture 30 to compensate for spurious motion of an imaging device such as a film or video camera, and thus to stabilize the images of an object 26 focused on the imaging plane 22 of the camera. To implement this application of the invention, camera 140 is equipped with an inertial sensor 142, such as an accelerometer. This sensor sends signals indicative of camera motion to a controller 144 which translates the camera motion signals into drive signals for actuator 4 drivingly connected to optical element 28. If, during imaging of object 26, camera 140 experiences spurious upward motion, sensor 142, via controller 144, signals actuator 34 to move optical element 28 and thus lens aperture 30 downward. Downward camera motion induces upward motion of the lens aperture. It will be appreciated that by moving lens aperture in the opposite direction to spurious camera motion, the images of object 26 focused on the camera imagining plane by lens 24 can be stabilized against such camera motion. Image stabilization by compensating motion of the lens aperture in accordance with the present invention can be implemented quite inexpensively as compared with the current practices of gyro-stabilization of the entire camera or the use of moving mirrors and/or prisms to compensate for camera rotation and thus steady the object images appearing on the camera imaging plane.

Figure 13:
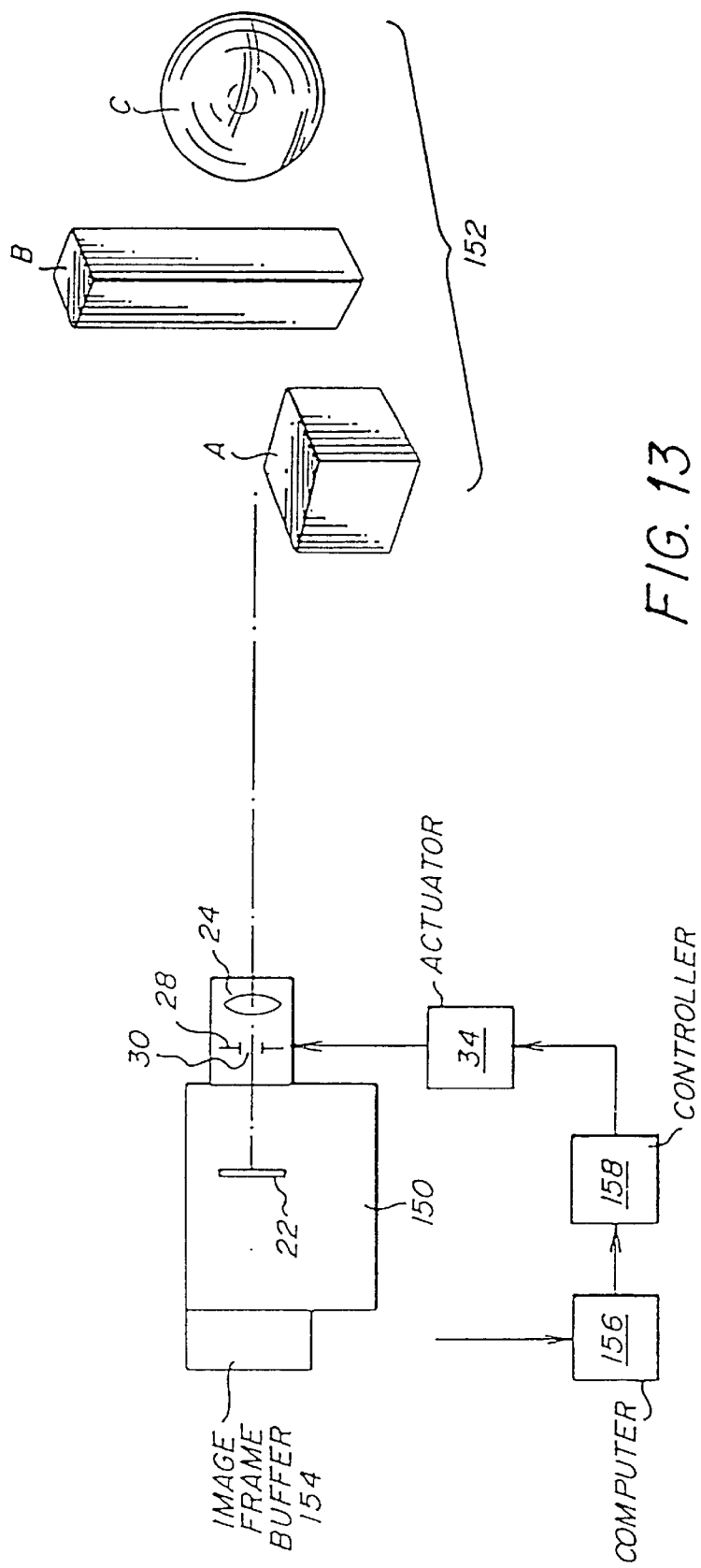
FIG. 13 is a schematic diagram illustrating the application of automatic disparity control to an autostereoscopic imaging apparatus incorporating the teachings of the present invention.

The apparent motion of objects in a scene being imaged, such as objects A, B and C in FIGS. 10(a)–10(c), can also be used to automatically control lens aperture motion. Thus as illustrated in FIG. 13, a camera 150, such as a video or film camera, is aimed to view a scene 152 including objects A, B and C. The camera lens 24 is adjusted to focus the image of one of these objects on an imaging plane 22. Images of the scene are stored on a frame-by-frame basis in an image frame buffer 154. A computer 156 compares successive stored image frames, such as by subtracting one from the other, to quantify the motion characteristics of the images of the other objects relative to the stationary image of the focused object. The quantified motion characteristics are used by a controller 158 to adjustably control the parallax scanning pattern, produced by actuator 34, of lens aperture 30 in optical element 28. In this manner, a desired three-dimensional effect can be automatically achieved by constant monitoring the motions of object images appearing on imaging plane 22 and adjusting amplitude (offset of disparity positions from lens optical axis) and frequency of the lens aperture scanning motion according to the extents of relative image motions.

Figure 14:
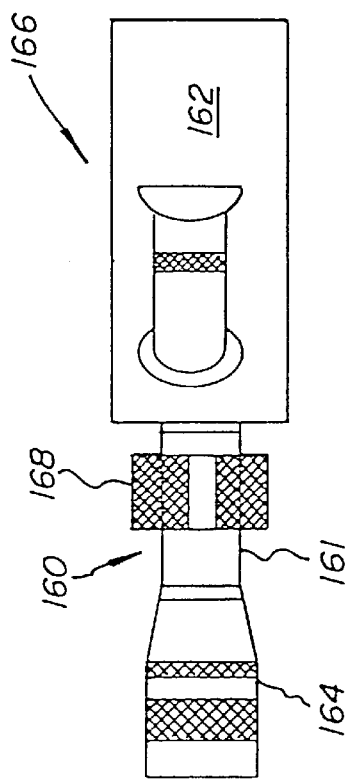
FIG. 14 is a side view of an embodiment incorporating the teachings of the present invention implemented in an optical relay assembled between a conventional camera lens and a conventional camera body.

FIG. 14 illustrates that the parallax scanning lens aperture may be incorporated in a 1:1 optical relay 160 that is simply installed between the body 162 and the lens system 164 of a conventional camera, generally indicated at 166. Scanning motion of the lens aperture is produced by an actuator included in the relay and generally indicated at 168. It will be appreciated that optical relays having ratios other than 1:1 may be used in the practice of the present invention.

Figure 15:
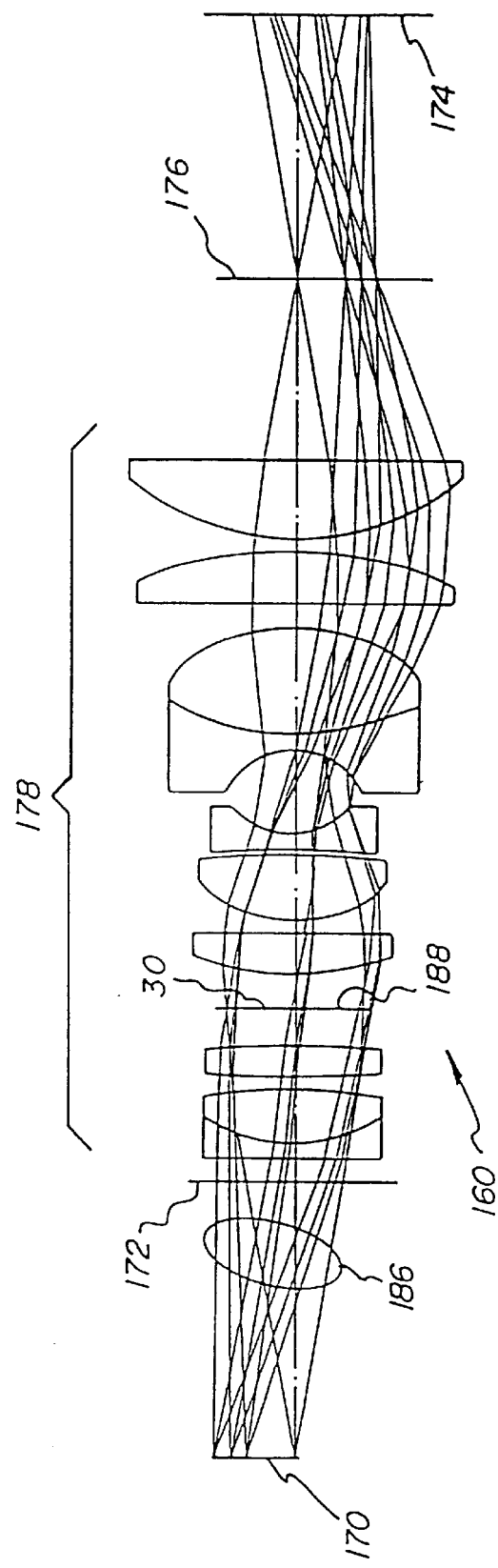
FIG. 15 is a side view of the various optical elements included in the optical relay of FIG. 14.

The optics of relay 160, incorporated in relay housing 161, are illustrated in FIG. 15. Reference numeral 170 represents the focal (image) plane of camera 166, and line 172 represents the mounting flange interface between camera body 162 and relay 160. Line 174 represents the mounting interface between lens 164 and relay 160, while reference numeral 176 represents the focal plane of lens 164. The optics of relay 160 comprise a set of lenses, commonly indicated at 178, that may be termed a "modified double Gauss" arrangement. Lines 186 represent the rays of scene image light passing through the optical elements of relay 160.

In accordance with a feature of the present invention, an element 188 that defines lens aperture 30 is positioned at the illustrated location between a pair of adjacent lenses of set 178 where the pupil position of lens 164 is replicated, and thus element 188 can serve the purpose of the iris of lens 164. Moreover, this replicated pupil position is conducive to accepting the parallax scanning motion of lens aperture 30. The iris (not shown) incorporated in camera lens 164 is adjusted to a wide open setting, and thus the opening size of lens aperture 30 determines the amount of image light focused on the camera image plane 170.

Figure 16A:
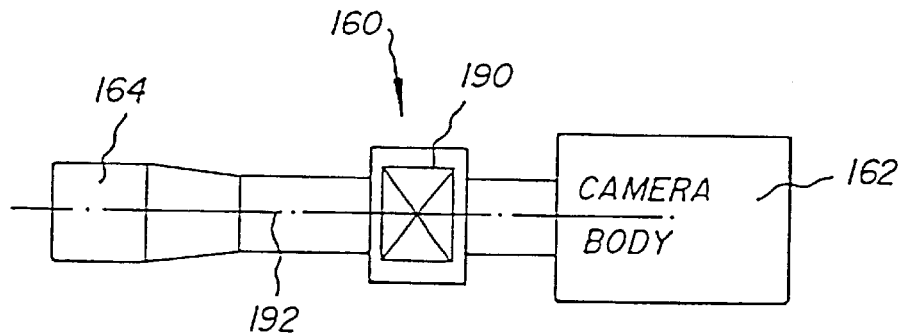
FIGS. 16(a), 16(b) and 16(c) are plan views illustrating various implementations of correction optical elements to the optical relay of FIG. 14.
Figure 16B:
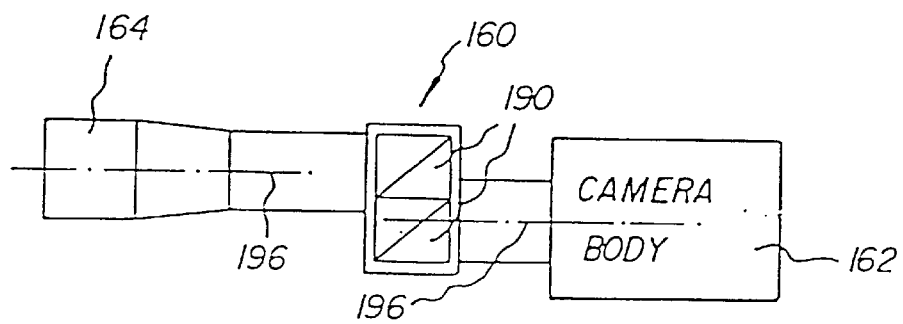
Figure 16C:
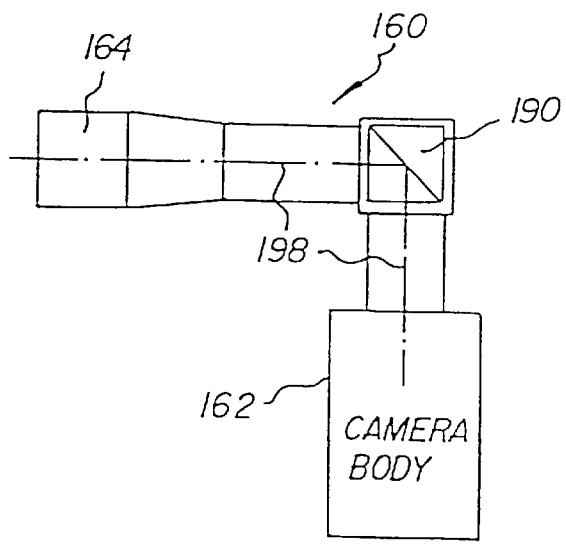

Since the scene being imaged is rotated 180° by the optical elements of relay 160, provisions must be made rotate the scene image 180° back to its correct orientation. In the case of a video camera, this correction may be readily accomplished electronically. In the case of a film camera, this correction may be made in the film processing lab, although this is an involved and therefore expensive procedure. Alternatively, as illustrated in FIGS. 16(a), 16(b) and 16(c), the 180° correction rotation of the scene image may be achieved by incorporating one or several known optical elements, such as Pechan, porro, roof, dove and Amici prisms in relay 160. FIG. 16(a) illustrates that the correction optical element(s) 190 may be incorporated such that the optical axis of relay 160 is aligned with the optical axis of camera lens 164, as indicated at 192. In FIG. 16(b) the incorporated correction optical elements result in a parallel offset of the relay optical axis, as indicated at 196. Alternatively, FIG. 16(c) illustrates that the correction optical elements 190 may be positioned to produce a 90° turn in the relay optical axis, as indicated at 198.

Figure 18A:
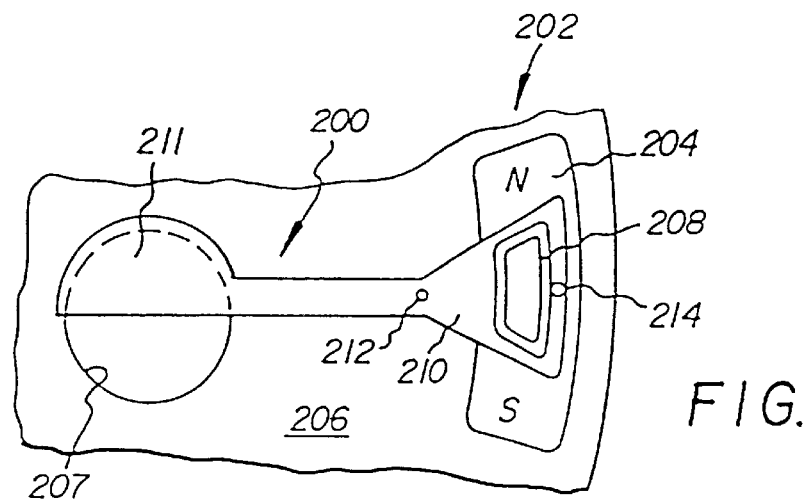
FIGS. 18(a), 18(b), and 18(c) are fragmentary front, side, and end views of one of the plural actuators acting to adjustably position individual lens aperture defining leaves of the optical element of FIGS. 17(a) and 17(b)

The optical element 188 that defines lens aperture 30 (FIG. 15) is preferably in the form of a plurality leaves, e.g., eight in number, each schematically illustrated at 200 in FIGS. 17(a) and 17(b). The leaves 200, individually of the shape illustrated in FIG. 18(a), are arranged in partially lapped (interleaved) relation, in the manner of a conventional camera lens iris, and are jointly positioned not only to define lens aperture 30, but also to move the lens aperture in a parallax scanning pattern (illustrated by arrow 201 as being circular). Moreover, as seen in FIGS. 17(a) and 17(b), the positions of leaves 200 are also adjusted to define the opening size of lens aperture 30 according to available scene lighting. Individual positionally adjustments of the leaves 200 are accomplished by a plurality of actuators 202 arranged in a circle about the axis of relay 160.

Figure 18B:
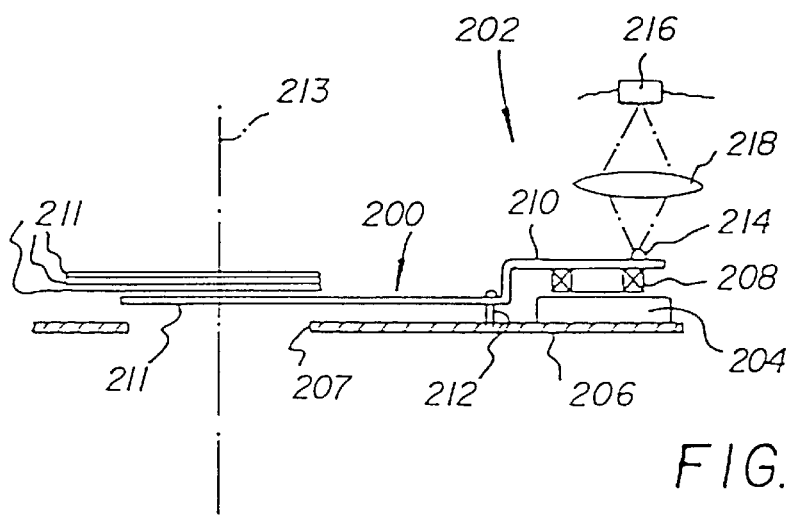
Figure 18C:
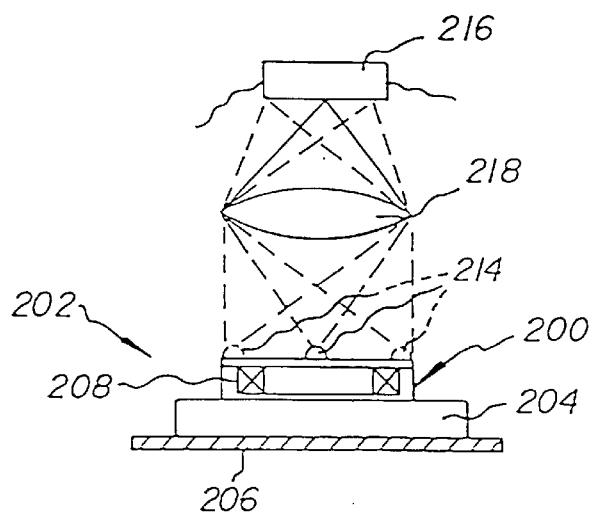

Turning to FIGS. 18(a)–18(c), each actuator 202 includes a permanent magnet 204, of arcuate shape, mounted to a common stationary annular plate 206 and an electromagnetic coil 208 mounted to the underside of an outer platform extension 210 of one of the leaves 200. Each leaf is pivotally mounted to plate 206 by a separate pin 212 for radially inward extension (relative to the relay axis 213) to position an opaque, semicircular inner end portion 211 in partially blocking relation with a large central opening 207 in plate 206 and in interleaved relation with the end portions 211 of the other leaves. Controlled electrical energization of coil 208 generates a magnetic field that interacts with the permanent magnet magnetic field to adjustably, pivotally position leaf 200 relative to relay axis 213.

To provide feedback control of actuator coil energization so as to achieve a desired position of each of the leaves 200, a light-emitting diode (LED) 214 is mounted on leaf platform 210. The light emitted by LED 214 is focused by a lens 218 on a light sensor 216. By determining the point of impingement of the focused LED emitted light spot on senor 216, as illustrated in FIG. 18(c), the position of leaf 200 can be identified.

Suitable position optical sensors for this application, are, for example, non-discrete silicon position sensitive detectors, available from Hamamatsu Corporation of Bridgewater, N.J., as Parts Nos. 51200, 51300 and 51352. These detectors produce analog position indicating signal outputs.

Figure 19:
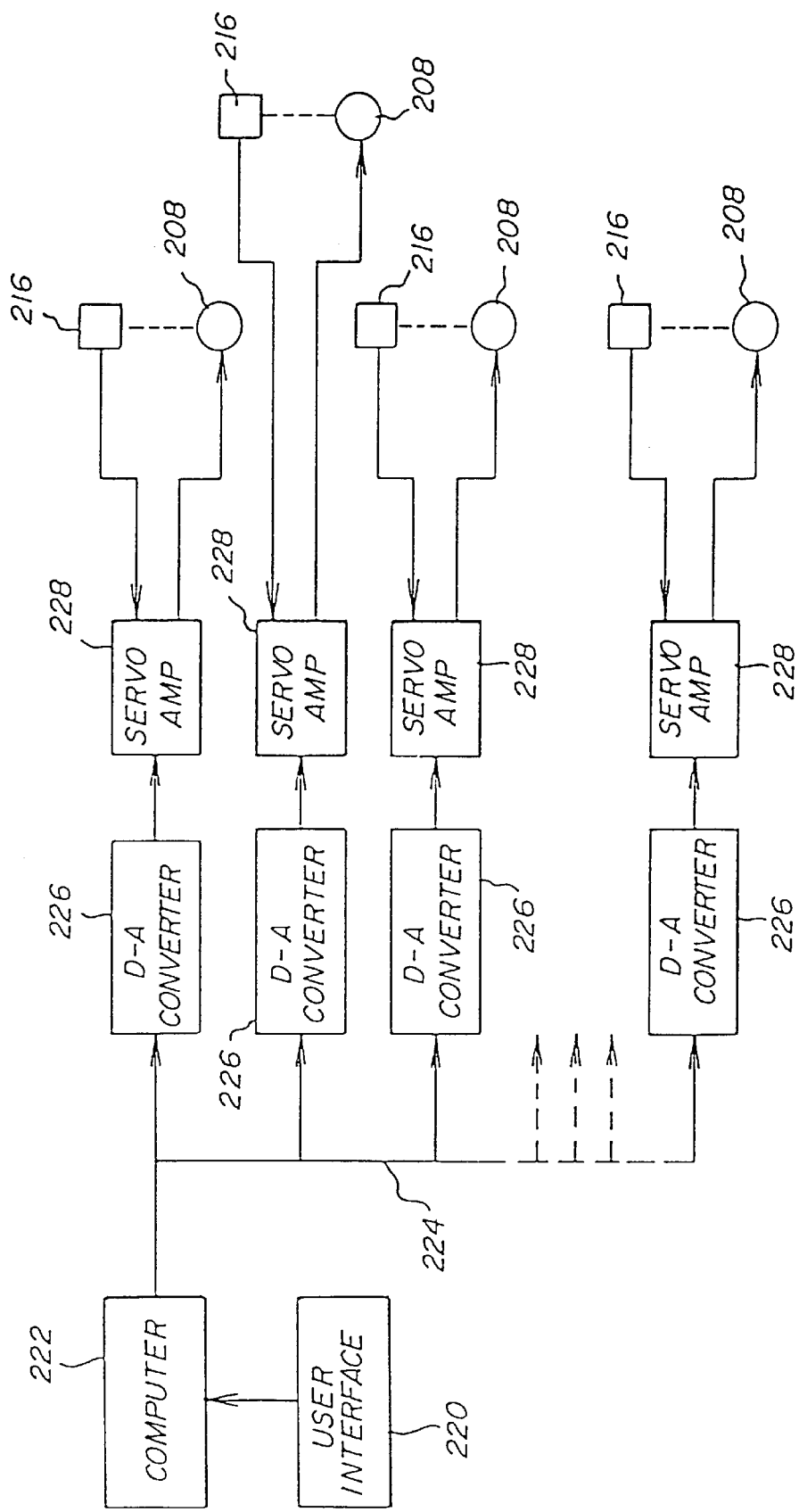
FIG. 19 is a block diagram of an electronic circuit for controlling the operations of each of the actuators seen in FIGS. 18(a)–18(c).

FIG. 19 illustrates how the plural actuators 202 may be electrical controlled to define lens aperture 30, produce lens aperture motion according to a desired parallax scanning pattern, and adjust aperture opening size. Block 220 represents a user interface with a digital computer 222 suitably programmed or hardware designed to control the electrical energizations of all of the actuator coils 208. Using interface 220, the user makes keypad entries to computer 222 appropriate for effecting the desired lens aperture parameters, i.e., opening size, parallax scanning pattern, pattern size, pattern cycle rate, etc. According to the parameters entered by the user, computer 222 outputs a stream of separate leaf positioning commands on a digital bus 224 to a plurality of digital-to-analog converters 226. The analog outputs of these converters are fed to separate servo-amplifiers 228, each connected to energize a different actuator coil 208. Each servo-amplifier 228 receives, as a feedback input, the leaf position signal outputted by the associated optical position sensor 216. Each servo-amplifier 228 continuously compares the sensor feedback, indicating the present position of the associated leaf 200, and the leaf position command signal received from the associated D-A convertor 226, indicating the position the associated leaf 200 must assume, and adjusts the actuator coil energization to null the position command and feedback signal. As the position commands change, actuators 202 react accordingly to produce lens aperture motion, as well as adjustments in opening size.

It is thus seen that, while the present invention has been described in the content of moving a lens aperture in a parallax scanning pattern, as images of objects are recorded, it will be appreciated that effective depth perception of displayed images or object range can be achieved by providing an optical element which can alternatingly create a lens aperture at different disparity positions offset from the lens optical axis. Thus, rather than moving a single aperture in a parallax scanning pattern through different disparity positions, an equivalent parallax scanning pattern can be achieved by utilizing an optical element or combination of optical elements controlled to create momentary lens apertures at various disparity positions vertically, horizontally and/or both horizontally and vertically offset from the lens optical axis. Using this approach, the optical element or elements can function as the camera shutter, as well as the lens aperture. The optical element of FIG. 8 is particular suited for this approach to the practice of the present invention.

It will be apparent to one skilled in the art that various modifications and variations can be made in the autostereoscopic imaging apparatus of the present invention without departing from the scope or spirit of the invention. Thus, it is intended that the present invention cover modifications and variations of this invention provided they come within the scope of the appended claims and their equivalents.

What is claimed is:

1. A method of generating stereoscopic images, comprising the steps of:
   simulating a virtual lens having an optical axis directed toward a virtual scene to be imaged;
   simulating a virtual lens aperture located, time displaced, in more than four disparity positions during each of a plurality of aperture location cycles;
   generating images with said virtual lens aperture in said more than four disparity positions, which, when displayed in succession on a conventional two-dimensional display, produce an autostereoscopic image of the virtual scene.

2. The method of claim 1, further including adjusting the time displaced simulation of said virtual lens aperture so as to produce a view cycle rate within a range of three to six Hz.

3. The method of claim 1, further including the step of adjusting a virtual opening size of virtual the lens aperture.

4. The method of claim 1, further including the step of adjusting a magnitude of disparity position offset from the optical axis.

5. A method of computer generating autostereoscopic images comprising:
   defining an object in a virtual three-dimensional space;
   defining a virtual imaging device;
   generating images by simulating a parallax scanning motion of a point of view of the virtual image device;
   storing the generated images;
   displaying the generated images on a display device.

6. The method of claim 5, wherein the simulated parallax scanning motion is defined by characteristics including at least one of parallax angle, cycle frequency, and convergence.

7. The method of claim 6, wherein the simulated parallax scanning motion characteristics are adjusted in view of the object and the three-dimensional space.

8. The method of claim 5, wherein the definition of the virtual imaging device includes simulating an imaging plane.

9. The method of claim 5, wherein the definition of the virtual imaging device includes the simulation of a lens.

10. The method of claim 5, wherein the definition of the virtual imaging device includes the simulation of a lens aperture.

11. The method of claim 5, wherein the virtual imaging device is a virtual camera.

12. The method of claim 5, wherein the step of generating images is performed using a ray tracing algorithm.

13. A method of generating virtual autostereoscopic images using a computer, the method comprising:
   a) defining a three-dimensional virtual scene;
   b) selecting a point of view for creating a virtual image of the scene;
   c) generating a virtual image of the scene from the point of view;
   d) selecting a new point of view;
   e) generating a new virtual image of the scene from the new point of view;
   f) repeating steps d) and e), wherein a pattern of said points of view define a parallax scanning pattern.

14. The method of claim 13, wherein the parallax scanning pattern is defined by parallax scanning characteristics including at least one of parallax angle, cycle frequency, and convergence.

15. The method of claim 14, wherein the parallax scanning characteristics are adjusted in view of characteristics of the three-dimensional scene.

16. The method of claim 13, further comprising:
storing the virtual images.

17. The method of claim 13, further comprising:
recording the virtual images on image storage media.

18. The method of claim 13, further comprising:
displaying the virtual images on a display device.

19. The method of claim 13, wherein the display device is one of a television screen, a computer monitor, and a projection screen.

20. A method of producing autostereoscopic images using a computer, the method comprising:
defining a three-dimensional virtual scene;
selecting a point of view withing the three-dimensional virtual scene;
defining a cyclical parallax scanning pattern about the point of view;
selecting imaging points along the cyclical parallax scanning pattern;
generating images of the three-dimensional scene using the imaging points as points of view.

21. The method of claim 20, wherein the cyclical parallax scanning pattern is defined by parallax scanning characteristics including at least one of parallax angle, cycle frequency, and convergence.

22. The method of claim 21, wherein the parallax scanning characteristics are adjusted in view of characteristics of the three-dimensional scene.

23. The method of claim 20, wherein at least four images are generated during each cycle of the cyclical parallax scanning pattern.

24. The method of claim 20, wherein the imaging points are selected so as to differ between cycles of the cyclical parallax scanning pattern.

25. The method of claim 20, further comprising:
displaying the generated images on a two-dimensional screen.

26. The method of claim 20, wherein a cycle rate of the cyclical parallax scanning pattern is selected in relation of a view rate of display of the generated images so as to produce a cyclical point of view movement of the generated images of between three and six Hz.

27. A computer readable medium storing machine readable code, the machine readable code containing instruction for a computer to perform a method comprising:
defining a three-dimensional virtual scene;
selecting a point of view within the three-dimensional virtual scene;
defining a cyclical parallax scanning pattern about the point of view;
selecting imaging points along the cyclical parallax scanning pattern;
generating images of the three-dimensional scene using the imaging points as points of view.

* * * * *